US010102678B2

(12) United States Patent
Gavriliuc et al.

(10) Patent No.: US 10,102,678 B2
(45) Date of Patent: *Oct. 16, 2018

(54) VIRTUAL PLACE-LOCATED ANCHOR

(71) Applicant: Microsoft Technology Licensing, LLC, Redmond, WA (US)

(72) Inventors: Anatolie Gavriliuc, Kirkland, WA (US); Dan Osborn, Woodinville, WA (US); Stephen Heijster, Kirkland, WA (US); Hongwu Huai, San Bruno, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,934

(22) Filed: Nov. 23, 2016

(65) Prior Publication Data

US 2017/0076505 A1   Mar. 16, 2017

Related U.S. Application Data

(63) Continuation of application No. 14/748,715, filed on Jun. 24, 2015, now Pat. No. 9,520,002.

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0103* (2013.01); *G02B 27/0172* (2013.01);
(Continued)

(58) Field of Classification Search
CPC . G06T 19/006; G06T 19/04; G06T 2219/024; G06T 2200/04; G02B 2027/0174
See application file for complete search history.

(56) References Cited

U.S. PATENT DOCUMENTS 6,774,869 B2   8/2004   Biocca et al.
8,134,553 B2   3/2012   Saini et al.
(Continued)

FOREIGN PATENT DOCUMENTS

CN   102592315 A   7/2012
WO   2012135546 A1   10/2012
(Continued)

OTHER PUBLICATIONS

IPEA European Patent Office, Second Written Opinion issued in PCT Application No. PCT/US2016/036113, dated May 12, 2017, WIPO, 10 pages.
(Continued)

*Primary Examiner* — Xuemei Zheng
(74) *Attorney, Agent, or Firm* — Alleman Hall Creasman & Tuttle LLP

(57) ABSTRACT

A method is disclosed that includes receiving an instruction to generate a virtual place-located anchor at a virtual location that is world-locked. Data items from a target data source are received. A subset of the data items is linked to the virtual place-located anchor. A first display device is caused to display virtual content of the subset of data items at the virtual place-located anchor. If a condition under which a second user is authorized to view the virtual content is satisfied, a second display device is caused to display the virtual content at the virtual place-located anchor.

19 Claims, 10 Drawing Sheets

(51) Int. Cl.
*H04L 12/58* (2006.01)
*G06F 3/01* (2006.01)
*G03H 1/00* (2006.01)
*G06Q 50/00* (2012.01)
*G03H 1/22* (2006.01)
*G06F 3/147* (2006.01)

(52) U.S. Cl.
CPC ......... *G03H 1/0005* (2013.01); *G03H 1/2294* (2013.01); *G06F 3/011* (2013.01); *G06F 3/147* (2013.01); *G06Q 50/01* (2013.01); *H04L 51/32* (2013.01); *G02B 27/017* (2013.01); *G02B 2027/014* (2013.01); *G02B 2027/0174* (2013.01); *G02B 2027/0178* (2013.01); *G02B 2027/0187* (2013.01); *G03H 2227/02* (2013.01); *G03H 2270/55* (2013.01); *G06T 2200/04* (2013.01); *G06T 2219/024* (2013.01); *G09G 2370/16* (2013.01)

(56) References Cited

U.S. PATENT DOCUMENTS

| | | | |
|---|---|---|---|
| 8,479,110 | B2 | 7/2013 | Johnson et al. |
| 8,553,965 | B2 | 10/2013 | Zhao et al. |
| 8,572,177 | B2 | 10/2013 | Goldman et al. |
| 8,587,601 | B1 | 11/2013 | Kahn et al. |
| 8,595,299 | B1 | 11/2013 | Wang et al. |
| 8,683,386 | B2 | 3/2014 | Shuster |
| 8,814,691 | B2 | 8/2014 | Haddick et al. |
| 8,930,844 | B2 | 1/2015 | Carlin |
| 8,966,356 | B1 | 2/2015 | Hickman et al. |
| 8,982,013 | B2 | 3/2015 | Sako et al. |
| 9,041,739 | B2 | 5/2015 | Latta et al. |
| 9,268,454 | B2 | 2/2016 | Hamilton, II et al. |
| 9,432,421 | B1* | 8/2016 | Mott ............... H04W 4/025 |
| 2009/0278766 | A1 | 11/2009 | Sako et al. |
| 2010/0164990 | A1 | 7/2010 | Van Doom |
| 2010/0222040 | A1 | 9/2010 | Bosan et al. |
| 2012/0092379 | A1 | 4/2012 | Tsuji et al. |
| 2012/0169729 | A1 | 7/2012 | Yamaji et al. |
| 2012/0212484 | A1* | 8/2012 | Haddick ............ G02B 27/0093 345/419 |
| 2012/0249416 | A1 | 10/2012 | Maciocci et al. |
| 2012/0249741 | A1* | 10/2012 | MacIocci ................ G06F 3/011 348/46 |
| 2012/0287127 | A1 | 11/2012 | Ikeda et al. |
| 2013/0271457 | A1 | 10/2013 | Haswell et al. |
| 2013/0278631 | A1 | 10/2013 | Border et al. |
| 2013/0293468 | A1* | 11/2013 | Perez ................... G06F 3/033 345/158 |
| 2013/0342571 | A1 | 12/2013 | Kinnebrew et al. |
| 2014/0002442 | A1 | 1/2014 | Lamb et al. |
| 2014/0002444 | A1 | 1/2014 | Bennett et al. |
| 2014/0047385 | A1 | 2/2014 | Ruble et al. |
| 2014/0063060 | A1 | 3/2014 | Maciocci et al. |
| 2014/0152558 | A1 | 6/2014 | Salter et al. |
| 2014/0160157 | A1 | 6/2014 | Poulos et al. |
| 2014/0184602 | A1 | 7/2014 | Tuffreau et al. |
| 2014/0204117 | A1 | 7/2014 | Kinnebrew et al. |
| 2014/0282008 | A1 | 9/2014 | Verard et al. |
| 2014/0306993 | A1 | 10/2014 | Poulos et al. |
| 2014/0362112 | A1 | 12/2014 | Morrison et al. |
| 2014/0364215 | A1 | 12/2014 | Mikhailov et al. |
| 2015/0049002 | A1 | 2/2015 | Ishikawa et al. |
| 2015/0091891 | A1 | 4/2015 | Raheman et al. |
| 2016/0005229 | A1 | 1/2016 | Lee et al. |
| 2016/0131912 | A1* | 5/2016 | Border ............... G02B 27/0176 345/8 |
| 2016/0292926 | A1* | 10/2016 | Rosenthal ........ H04N 21/41407 |
| 2017/0262154 | A1* | 9/2017 | Black .................. G06F 3/04815 |

FOREIGN PATENT DOCUMENTS

| | | |
|---|---|---|
| WO | 2013166362 A2 | 11/2013 |
| WO | 2014031899 A1 | 2/2014 |

OTHER PUBLICATIONS

Goldberg, S. et al., "DIGIMUSE: An interactive telerobotic system for remote viewing of three-dimensional art objects," Telemanipulator and Telepresence Technologies V, SPIE 3524, Dec. 18, 1998, 5 pages.

Welch, G. et al., "Remote 3D Medical Consultation," 2nd International Conference on Broadband Networks, BroadNets 2005, Oct. 3, 2005, 8 pages.

Takahashi, S. et al., "Real Time 3D Avatar Transmission Using Cylinder Mapping," IEEE International Conference on Acoustics, Speech and Signal Processing, ICASSP 2007, vol. 1, Apr. 15, 2007, 4 pages.

Abate, D. et al., "3D Modeling and Remote Rendering Technique of a High Definition Cultural Heritage Artifact," First World Conference on Information Technology, WCIT 2010, Oct. 6, 2010, 5 pages.

Forte, M. et al., "Cyberarchaeology: Experimenting with Teleimmersive Archaeology," 16th International Conference on Virtual Systems and Multimedia, VSMM 2010, Oct. 20, 2010, 8 pages.

Hartl, A. et al., "Rapid Reconstruction of Small Objects on Mobile Phones," IEEE Computer Society Conference on Computer Vision and Pattern Recognition Workshops, CVPRW 2011, Jun. 20, 2011, 8 pages.

Jones, B. et al., "IllumiRoom: Peripheral Projected Illusions for Interactive Experiences," ACM SIGCHI Conference on Human Factors in Computing Systems, CHI 2013, Apr. 27, 2013, 10 pages.

"X-ISS Creates Affordable, Efficient Remote 3D Visualization Solution," Available at http://www.x-iss.com/case-studies/x-iss-creates-affordable-efficient-remote-3d-visualization-solution/, Available as Early as Aug. 2, 2015, Retrieved Sep. 16, 2015, 4 pages.

"Interactive 3D Content Sharing," Available Online at http://ieeexplore.ieee.org/stamp/stamp.jsp?arnumber=5720683, Retrieved Oct. 7, 2015, 1 page.

"The Era of Holographic Computing is Here", Microsoft.com, http://www.microsoft.com/microsoft-hololens/en-us, Available as early as Jan. 21, 2015, Retrieved on Mar. 24, 2015, 11 pages.

Wassom, B., "Augmented Reality" by Any Other Name: Still as Sweet?, wassom.com, http://www.wassom.com/augmented-reality-by-any-other-name-still-as-sweet.html, Mar. 6, 2015, 3 pages.

ISA European Patent Office, International Search Report and Written Opinion Issued in Application No. PCT/US2016/036113, dated Aug. 17, 2016, WIPO, 15 pages.

United States Patent and Trademark Office, Notice of Allowance issued in U.S. Appl. No. 14/748715, dated Aug. 16, 2016, 8 pages.

United States Patent and Trademark Office, Corrected Notice of Allowance issued in U.S. Appl. No. 14/748715, dated Oct. 14, 2016, 2 pages.

"International Preliminary Report on Patentability Issued in PCT Application No. PCT/US2016/036113", dated Sep. 25, 2017, 11 Pages.

* cited by examiner

VIRTUAL PLACE-LOCATED ANCHOR

CROSS REFERENCE TO RELATED APPLICATIONS

This application is a continuation of U.S. Ser. No. 14/748,715, filed Jun. 24, 2015, the entirety of which is hereby incorporated herein by reference for all purposes.

BACKGROUND

Web-based social networks, email and other on-line platforms enable users to share and exchange digital content, such as messages, images, video, audio, etc. With the proliferation of mobile computing devices, the volume of such on-line content that is created and shared continues to increase.

To receive updates or other content from friends and others, a user may fetch or otherwise access a computing device and open a corresponding application to view such content. Given the increasing volume of on-line content, a user may sift through numerous notifications, updates, and other unrelated content to find the user's desired content, such as updates from a particular friend. In some cases, finding and activating a device, opening an application, and sorting through numerous items to find desired content may impose undesirable delays in the user receiving the desired content.

Some technologies enable users to experience a fully or partially virtual world. For example, some virtual reality head-mounted display (HMD) devices may display a fully-immersive, entirely virtual environment with no view of the real world. Other, augmented reality HMD devices may include a partially transparent display that blends a user's view of the real world with displayed virtual objects and other content. In some cases, a user may desire to share selected on-line content with another user who is using a virtual reality or augmented reality device. However, managing the availability and presentation of such content can prove challenging.

SUMMARY

To address these issues, a computing device and method are provided for generating a virtual place-located anchor at which holograms may be viewed. The computing device may comprise an anchor program executed by a processor of the computing device, wherein the anchor program is configured to, in a creating phase: receive an instruction to generate a virtual place-located anchor at a virtual location that is world-locked; receive a plurality of data items from a target data source at which a first user has an account; link a subset of the plurality of data items to the virtual place-located anchor; and receive a permission via user input from the first user, the permission specifying a condition under which a second user is authorized to view one or more holograms of the subset of data items.

The anchor program also may be configured to, in a viewing phase: transmit first display data to a first display device comprising an at least partially see-through display configured to visually augment a view of a real world three dimensional environment through the display, the first display data causing the first display device to display the one or more holograms of the subset of data items to the first user at the virtual place-located anchor at the virtual location; determine if the condition is satisfied; and if the condition is satisfied, transmit second display data to cause a second display device to display the one or more holograms of the subset of data items to the second user at the virtual place-located anchor at the virtual location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present descriptions relate to generating a virtual place-located anchor at which holograms and other virtual content may be viewed. As described in more detail below, in some examples display data may be transmitted to a display device to cause the device to display one or more holograms of a subset of data items at the virtual place-located anchor. In some examples, the display device may comprise an HMD device, such as an augmented reality display device that includes an at least partially see-through display configured to visually augment a view of a real world three dimensional environment through the display. In other examples, the HMD device may comprise a fully-immersive virtual reality display device. In other examples, the display device may comprise a tablet computer, smartphone, or other mobile computing device capable of visually augmenting a user's view of a real world three dimensional environment via the display.

Figure 1:
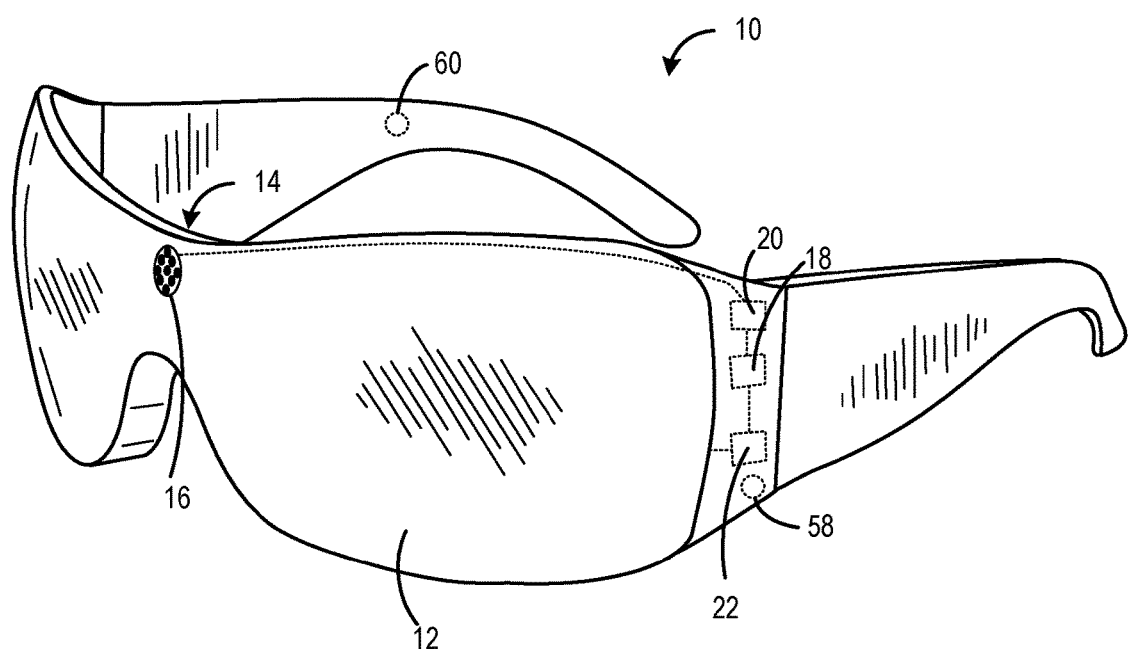
FIG. 1 shows a head-mounted display device according to an example of the present description.

FIG. 1 illustrates an HMD device 10 according to an example of the present disclosure. In this example, the illustrated HMD device 10 takes the form of wearable glasses or goggles, but it will be appreciated that other forms are possible. The HMD device 10 may include an at least partially see-through stereoscopic display 12 that may be configured to visually augment a view of a real world three dimensional environment by the user through the display.

For example, the HMD device 10 may include an image production system 22 that is configured to display virtual objects such as holograms to the user with the at least partially see-through display 12. The holograms may be visually superimposed onto the physical environment so as to be perceived at various depths and locations. The HMD device 10 may use stereoscopy to visually place a virtual object at a desired depth by displaying separate images of the virtual object to both of the user's eyes.

To achieve the perception of depth, the image production system 22 of the HMD device 10 may render the two images of the virtual object at a rendering focal plane of the HMD device 10, such that there is a binocular disparity between the relative positions of the virtual object in the two images. For example, such binocular disparity may be a horizontal disparity where the relative positions of the virtual object in the two images are separated by a distance in the x axis direction. In this embodiment, the x axis may be defined as the axis extending horizontally to the left and the right relative to the user, the y axis extending upward and downward vertically relative to the user, and the z axis extending forward and backward relative to the user, and orthogonally to the x and y axes.

The horizontal disparity between the relative positions of the virtual object in the two images will cause the user to perceive that the virtual object is located at a certain depth within the viewed physical environment due to stereopsis. Using this stereoscopy technique, the HMD device 10 may control the displayed images of the virtual objects, such that the user may perceive that the virtual objects exist at a desired depth and location in the viewed real world three dimensional environment.

In other examples, the at least partially see-through display 12 and image production system 22 may utilize other image display technologies and configurations. For example, the at least partially see-through display 12 may be configured to enable a wearer of the HMD device 10 to view a physical, real-world object in the physical environment through one or more partially transparent pixels that are displaying a virtual object representation. In some examples the display 12 may include image-producing elements located within lenses (such as, for example, a see-through Organic Light-Emitting Diode (OLED) display). As another example, the display 12 may include a light modulator on an edge of the lenses. In this example, the lenses may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

In other examples, the at least partially see-through display may comprise one or more optical redirection elements or techniques, such as a digital single lens reflex camera or other image capture device. In other examples, the display 12 may comprise a non-see-through display that provides an immersive, virtual reality experience in which virtual content such as holograms and/or two-dimensional images are displayed to a user.

The HMD device 10 includes an optical sensor system 14 that may include one or more optical sensors. In one example, the optical sensor system 14 may include an outward facing optical sensor 16 that may be configured to detect the real world environment from a similar vantage point (e.g., line of sight) as observed by the user through the see-through display 12. The optical sensor system 14 may include a variety of additional sensors, such as a depth camera and an RGB camera, which may be a high definition camera or have another resolution.

The HMD device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to assess a position and orientation of the vantage point of the see-through display 12 relative to other environmental objects. In some embodiments, the position and orientation of the vantage point may be characterized with six degrees of freedom (e.g., world-space X, Y, Z, pitch, roll, yaw). The vantage point may be characterized globally or independent of the real world background. The position and/or orientation may be determined with an on-board computing system (e.g., on-board computing system 20) and/or an off-board computing system.

In some examples, the HMD device 10 may receive and utilize data from sensors that are not located on the device. For example, the HMD device 10 may receive optical sensor information from one or more external cameras that are in the same room as the user. In some examples, the HMD device 10 may receive sensor data from another HMD device in the area. In some examples, the HMD device 10 may receive position information from a tracking sensor on a movable object.

Furthermore, the optical sensor information and the position sensor information may be used by a computing system to perform analysis of the real world three dimensional environment, such as depth analysis, surface reconstruction, environmental color and lighting analysis, or other suitable operations. In particular, the optical and positional sensor information may be used to create a virtual model of the real world three dimensional environment. In some examples, the virtual model may comprise a three dimensional coordinate space that is overlaid upon the real world three dimensional environment. In some examples, such sensor information may be provided to another computing device, such as a server, that creates the virtual model of the real world three dimensional environment.

In some examples, the position and orientation of the vantage point may be characterized relative to this virtual space. Moreover, the virtual model may be used to determine positions of holograms and other virtual objects in the virtual space, and to add additional virtual objects to be displayed to the user at a desired depth and location within the virtual world.

The HMD device 10 may also include a microphone system that includes one or more microphones, such as microphone 58, that capture audio data. In other examples, audio may be presented to the wearer via one or more speakers, such as speaker 60 on the HMD device 10.

Figure 2:
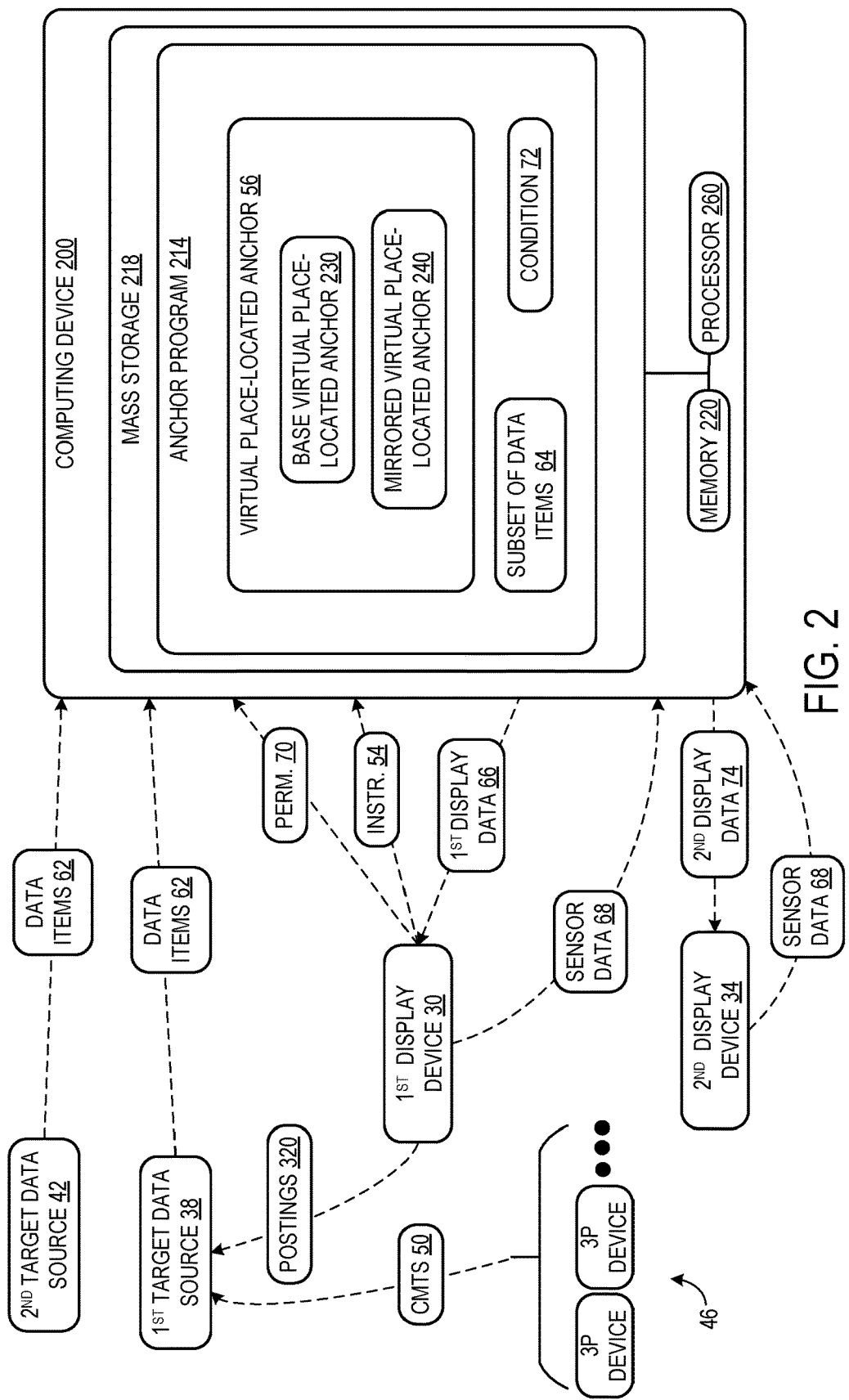
FIG. 2 is a schematic view of a computing device for generating a virtual place-located anchor according to an example of the present disclosure.

FIG. 2 is a schematic illustration of a computing device 200 interacting with display devices and target data sources according to an embodiment of the present disclosure. As explained in more detail below, the computing device 200 may be used to generate a virtual place-located anchor at a virtual location that is world-locked. Computing device 200 may take the form of a server, networking computer, gaming console, mobile communication device, desktop computer, laptop computer, tablet computer, set-top box (e.g. cable television box, satellite television box), or any other type of suitable computing device. In some examples, computing device 200 may comprise an embedded system within a larger electronic or mechanical device or system. Additional details regarding the components and computing aspects of the computing device 200 are described in more detail below with respect to FIG. 8.

The computing device 200 may include an anchor program 214 that may be stored in mass storage 218 of the computing device. The anchor program 214 may be loaded into memory 220 and executed by a processor 260 of the computing device 200 to perform one or more of the methods and processes for generating a virtual place-located anchor, as described in more detail below.

The computing device 200 may be communicatively coupled to one or more other devices via a wired connection or a wireless connection to a network. In some examples, the network may take the form of a local area network (LAN), wide area network (WAN), wired network, wireless network, personal area network, or a combination thereof, and may include the Internet. In the example of FIG. 2, computing device 200 is communicatively coupled to a first display device 30, a second display device 34, a first target data source 38 and a second target data source 42 via one or more networks. In other examples the computing device 200 may be operatively connected with fewer or additional devices.

Figure 3:
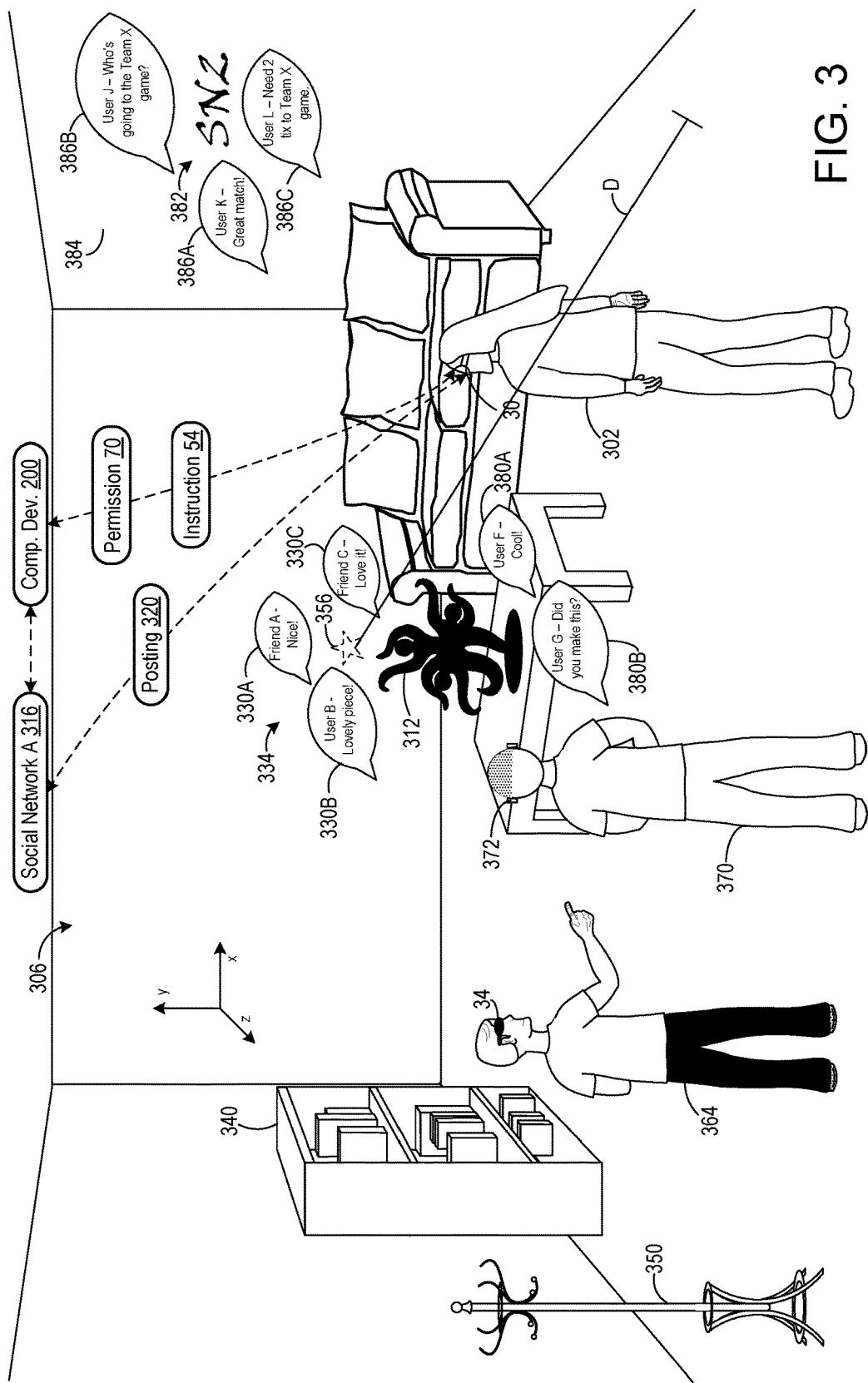
FIG. 3 shows users wearing head-mounted display devices of FIG. 1 in a first room according to an example of the present description.
Figure 4:
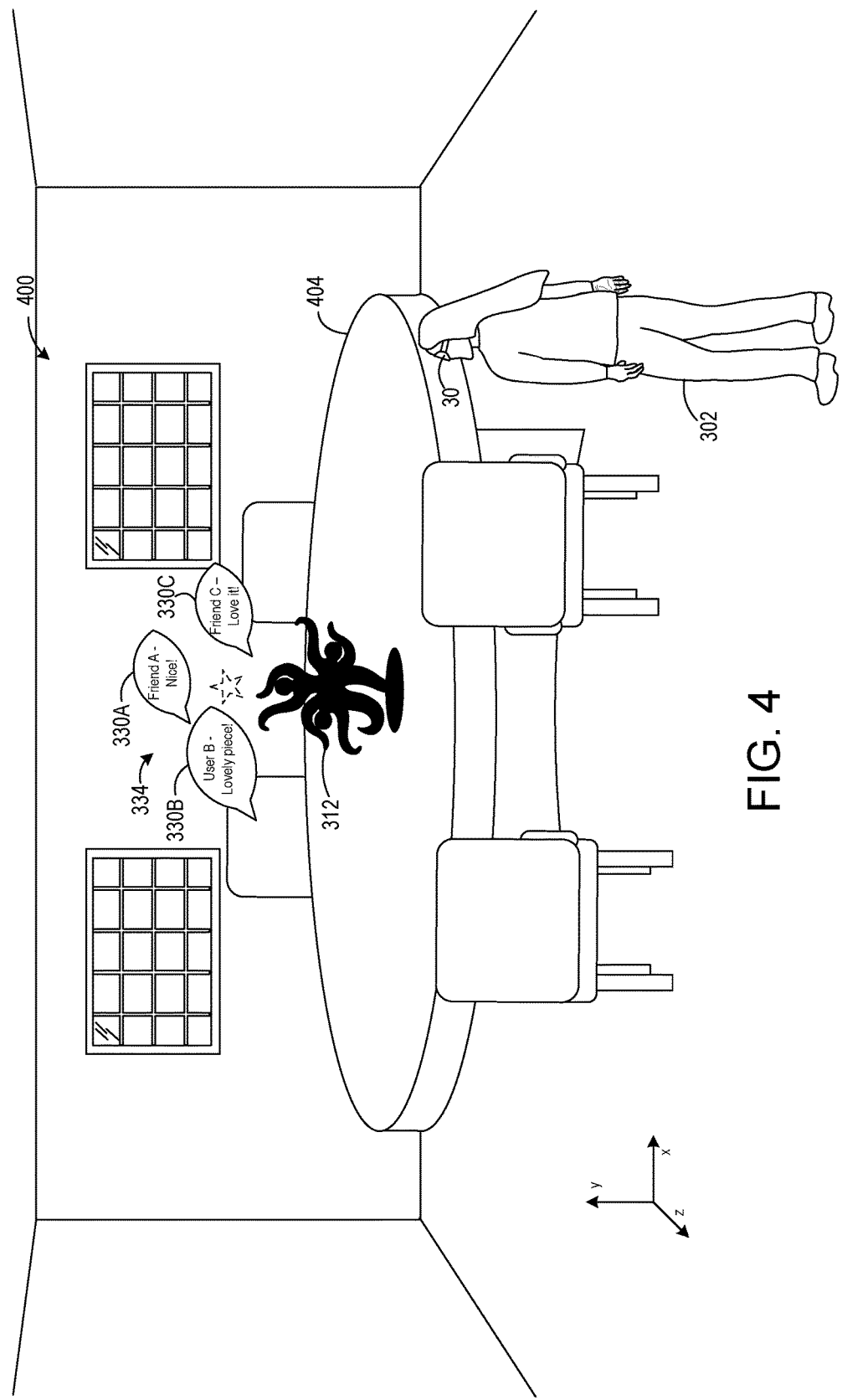
FIG. 4 shows a user from FIG. 3 wearing the head-mounted display device of FIG. 1 in a second room according to an example of the present description.

With reference also to FIGS. 3-6, example use cases illustrating aspects of the present disclosure will now be presented. As schematically shown in FIG. 3, a first user 302 may be standing in a living room 306 and may wear first display device 30, which in this example may take the form of HMD device 10 shown in FIG. 1. As noted above, first display device 30 (HMD device 10) may comprise an at least partially see-through display configured to visually augment the view of first user 302 through the display of the real world three dimensional environment of living room 306. The first display device 30 may generate a virtual model of the living room 306 using a three dimensional coordinate space overlaid upon the real world living room. In the example of FIG. 3, such three dimensional coordinate space is indicated by the x-y-z axes. As described in more detail below, the first display device 30 also may include program logic configured to identify physical objects within the living room 306.

With reference also to FIG. 2, first user 302 may have an account at the first target data source 38. In some examples the first target data source 38 may comprise a social network. As used herein, "social network" may include a variety of on-line platforms for building social relations among people who share interests, activities, backgrounds or other connections. Examples of social networks include, but are not limited to, on-line content sharing services, photo and/or video sharing services, recommendation services, instant messaging services, email services, combinations of the foregoing, and any other on-line platform that enables content sharing and/or communication among users. With reference to FIG. 3, in this example the first target data source 38 may be a Social Network A 316.

In the example of FIG. 3, first user 302 may use the first display device 30 to capture an image of the art piece 312. The first user 302 may desire to share the image with others via social network A 316. Accordingly, the first user 302 may send the image to the social network A 316 in a posting 320 to the network.

Other users of the social network A may post comments to the posting 320 from first user 302 on the network. In one example and with reference again to FIG. 2, one or more users may use one or more third party devices 46 to post comments 50 to the posting 320. For example, Friend A of first user 302 may use a third party device to post a comment 50 to the first user's posting 320. In some examples a comment may comprise text, an image, a video, a hashtag, and/or any combinations of the foregoing.

The first user 302 may desire to view the comment 50 and any other comments posted to social network A 316 regarding the first user's posting 320. Accordingly, and in one potential advantage of the present disclosure, first user 302 may instruct the First display device 30 to generate a virtual place-located anchor at a world-locked virtual location. In different examples, such instruction may comprise hand, head or other bodily gesture input, voice input, eye-tracking input, or other suitable user input. For example, first user 302 may speak an instruction to "Put an anchor at the art piece for comments to the picture I just posted to Social Network A." As described in more detail below, one or more holograms of the comment 50 and other comments to the first user's posting 320 may be displayed by First display device 30 at the art piece 312.

With reference also to FIG. 2, in some examples and in response to the instruction from the first user 302, the first display device 30 may transmit to computing device 200 an instruction 54 to generate a virtual place-located anchor 56 at a virtual location that is world-locked. Computing device 200 may be communicatively coupled to the first target data source 38, and may receive a plurality of data items 62 from the target data source. In examples where the first target data source 38 comprises social network A 316, the data items 62 may comprise postings, updates, and other items provided to the social network A by users, and may include items and other content generated by the social network.

In response to the instruction 54 from first user 302 via first display device 30, the anchor program 214 may link a subset 64 of the plurality of data items 62 from the first target data source 38 to the virtual place-located anchor 56. In the present example, the anchor program 214 may filter the data items 62 to identify and select comments to the first user's posting 320 of the image of the art piece 312. The anchor program 214 may then transmit first display data 66 to the first display device 30 that causes the device to display one or more holograms of this subset of data items to the first user 302.

In the example of FIG. 3, the first display device 30 may display to the first user 302 holograms of comments to the first user's posting 320 of the image of the art piece 312. For example, a hologram 330A of the comment "Nice!" from Friend A to the first user's posting 320 may be displayed at the world-locked virtual place-located anchor at the virtual location. One or more other holograms of comments to the first user's posting 320 from other friends and/or users of social network A, such as holograms 330B and 330C, may also be displayed.

These holograms may be displayed by the first display device 30 at the world-locked virtual place-located anchor 56. In some examples, the virtual location of the virtual place-located anchor 56 may be world-locked to a position that is fixed in the three dimensional coordinate space overlaid upon the real world three dimensional environment. In the example of FIG. 3, such a fixed position may be established as an area or a volume of space indicated at 334 that is adjacent to the art piece 312 which is the subject of the first user's posting 320.

As noted above, the first user 302 may designate the virtual location of the virtual place-located anchor via user input. In some examples, the first display device 30 may programmatically generate an instruction for a virtual place-located anchor at a world-locked virtual location. For example, in response to the first user's posting 320 of the image of the art piece 312, the first display device 30 may use sensor data to programmatically identify the art piece 312 in living room 306 as a subject of the posting. In response to identifying the art piece 312, the first display device 30 may programmatically transmit an instruction to computing device 200 to generate a virtual place-located anchor at a world-locked virtual location corresponding to the art piece 312.

In other examples, a fixed position may be defined as another location in the living room 306. For example, the first user 302 may provide user input that establishes a world-locked fixed position for the virtual place-located anchor 56 as the space above the bookcase 340. In other examples, such a fixed position may be defined as a room, building, inside a vehicle, at an outdoor space or location, or any location that may be mapped to a three dimensional coordinate space.

In some examples, the virtual location of the virtual place-located anchor 56 may be world-locked to a position relative to an object in the real world three dimensional environment. With reference to FIG. 3, in one example the virtual place-located anchor may be world-locked to a position relative to the art piece 312 that is the subject of the first user's posting 320.

In some examples, where the virtual location of the virtual place-located anchor 56 is world-locked to a position relative to an object, the virtual place-located anchor may travel with the object. For example and with reference to FIG. 4, the art piece 312 may be moved from the living room 306 to the kitchen 400. In this example, when the art piece 312 is at an initial real world location in the living room 306, the first display device 30 may capture one or more images of the art piece as well as other aspects of the real world location.

After the art piece 312 has been moved to the table 404 in kitchen 400, the first user 302 may enter the kitchen. Using sensor data 68 collected from sensors of the first display device 30, the anchor program 214 may identify the art piece 312 and may identify the kitchen 400 as a subsequent real world location that is different from the initial real world location of the living room 306. In response to identifying the art piece 312 in the kitchen 400, the computing device 200 may transmit display data to the first display device 30 that causes the device to display the holograms 330A, 330B and 330C to the first user 302 at the virtual place-located anchor at the virtual location world-locked to the position relative to the art piece 312 in the kitchen 400.

In other examples, a virtual place-located anchor may be world-locked to a position relative to an object that is not the subject of a user's posting. For example and with reference to FIG. 3, the virtual place-located anchor 56 the first user's posting 320 may be world-locked to a position relative to the coat rack 350. In this example, the first user 302 may provide via user input an instruction to "Put an anchor at the coat rack for comments to the picture I just posted to Social Network A." One or more holograms of the comment 50 and other comments to the first user's posting 320 may be displayed by first display device 30 at the coat rack 350.

In some examples the virtual place-located anchor 56 may not be displayed to a user. In other examples, an anchor hologram representing the virtual place-located anchor 56 at the world-locked virtual location may be displayed to a user. In the example of FIG. 3, an anchor hologram in the form of a holographic star 356 may be displayed at the world-locked virtual location corresponding to the virtual place-located anchor 56. In some examples, the holograms 330A, 330B and 330C may be displayed within a predetermined distance of the anchor hologram. For example, the holograms 330A, 330B and 330C may be displayed within 0.5 m, 1.0 m, 2.0 m, or any suitable predetermined distance from the holographic star 356.

In some examples, the appearance of the anchor hologram may be changed in response to one or more comments that are associated with the posting 320 of the first user 302. For example, when a new comment is posted, the appearance of the holographic star 356 may change to signal the receipt of a new comment. Examples of such a change in appearance of the anchor hologram may include blinking, changing color, changing size, etc. In some examples, the first user 302 may provide user input that triggers the display of a new hologram of the new comment.

In some examples, the first user 302 may desire to allow one or more others to view the holograms of the comments associated with the first user's posting 320. With continued reference to FIG. 3, the first user 302 may transmit via user input to first display device 30 one or more permissions 70 specifying one or more conditions 72 under which one or more others are authorized to view the holograms 330A, 330B and 330C.

In one example, a connection permission may specify a condition 72 that limits viewing of the holograms to other users who are connected with the first user 302 via one or more social networks, such as social network A. For example, the first user 302 may have a friend with whom the first user is connected via social network A. With reference again to FIG. 2, this friend may be associated with second display device 34. In the example of FIG. 3, this friend is illustrated as second user 364 who is wearing second display device 34 that may take the form of HMD device 10. The second display device 34 may be communicatively coupled to the computing device 200.

The first user 302 may create a connection permission 70 that specifies that other users who are connected with the first user 302 via social network A may view any holograms of comments associated with any postings of the first user to the social network A. In the example of FIG. 3, when the second user 364 enters the living room 306, and using sensor data 68 from the second display device 34, the anchor program 214 may identify the art piece 312 and discover the virtual place-located anchor 56 associated with the art piece. Anchor program 214 may determine that the condition 72 specified by the connection permission 70 is satisfied (e.g., second user 364 is connected with the first user 302 via a social network A). In response, computing device 200 may transmit second display data 74 to the second display device 34 that causes the device to display the holograms 330A, 330B and 330C to the second user 364 at the virtual place-located anchor 56 at the world-locked virtual location adjacent to the art piece 312.

In some examples, the first user 302 may create a place-based permission 70 that specifies a condition 72 that limits viewing of the holograms to other users who are located within a predetermined viewing range of the virtual place-located anchor. For example and with reference to FIG. 3, the first user 302 may create a place-based permission 70 that specifies that any other users who are present in the living room 306 may view holograms of comments associated with postings of the first user to the social network A. In this example, the predetermined viewing range is defined as being located in the living room 306.

In the example of FIG. 3, a work colleague 370 is visiting the first user 302 and standing in the living room 306. The work colleague may be wearing a display device 372 that may take the form of HMD device 10. The display device 372 may be communicatively coupled to the computing device 200. In the example of FIG. 3, when the work colleague 370 enters the living room 306, and using sensor data from the display device 372, the anchor program 214 may identify the art piece 312 and discover the virtual place-located anchor 56 associated with the art piece. Anchor program 214 may determine that the condition 72 specified by the place-based permission 70 is satisfied (e.g., work colleague 370 is located in the living room 306). Accordingly, computing device 200 may transmit display data to the display device 372 that causes the device to display the holograms 330A, 330B and 330C to the work colleague 370 at the virtual place-located anchor 56 at the world-locked virtual location.

In some examples, the place-based permission may specify a condition 72 that limits viewing of the holograms to other users who are located within a predetermined viewing range in the form of a threshold distance from the virtual place-located anchor 56. For example and with reference to FIG. 3, a threshold distance D from the virtual place-located anchor may be specified. If another user is within the threshold distance D, then such user may view the holograms, whether or not such user is connected to first user 302 via a social network.

In some examples, the virtual place-located anchor may be located outdoors in a public or private space. Also, it will be appreciated that many other example use cases and types of permissions are possible. For example, the first user 302 may specify a condition that allows one or more other defined groups of people to view holograms of comments associated with postings of the first user to the social network A. Examples of such groups may include, but are not limited to, those people with whom the first user 302 is connected via two or more social networks, those people within a specified social distance of the first user (such as friends of friends), an enumerated list of specific people, and any other suitable defined group.

In some examples, the first user 302 may desire to view holograms associated with postings of the first user to two or more social networks at the same virtual place-located anchor. With reference to FIG. 2, the first user 302 may have an account at the second target data source 42, which may comprise another social network. The computing device 200 may receive another plurality of data items 62 from the second target data source 42. As described above with respect to data items from the first target data source 38, the computing device 200 may link a subset of the plurality of data items from the second target data source 42, such as postings from the first user 302, to the virtual place-located anchor 56.

With reference also to the example of FIG. 3, the computing device 200 may transmit second target data source display data to the first display device 30 worn by first user 302 that causes the first display device to display one or more world-locked holograms of the subset of the plurality of data items from the second target data source 42 to the first user at the virtual place-located anchor. In the example of FIG. 3, the first display device 30 may display to the first user 302 holograms 380A and 380B of comments that reference or are otherwise associated with a posting made by the first user of the image of the art piece 312 to the second target data source 42. For example, a hologram 380A of the comment "Cool!" from User F may be displayed at the virtual place-located anchor at the world-locked virtual location. One or more other holograms of comments to the first user's posting from other friends and/or users of the other social network, such as hologram 380B, may also be displayed.

It will be appreciated that the first target data source 38 and second target data source 42 may comprise any of a variety of types of social networks, such as photo and/or video sharing services, recommendation services, instant messaging services, email services, etc.

Figure 5:
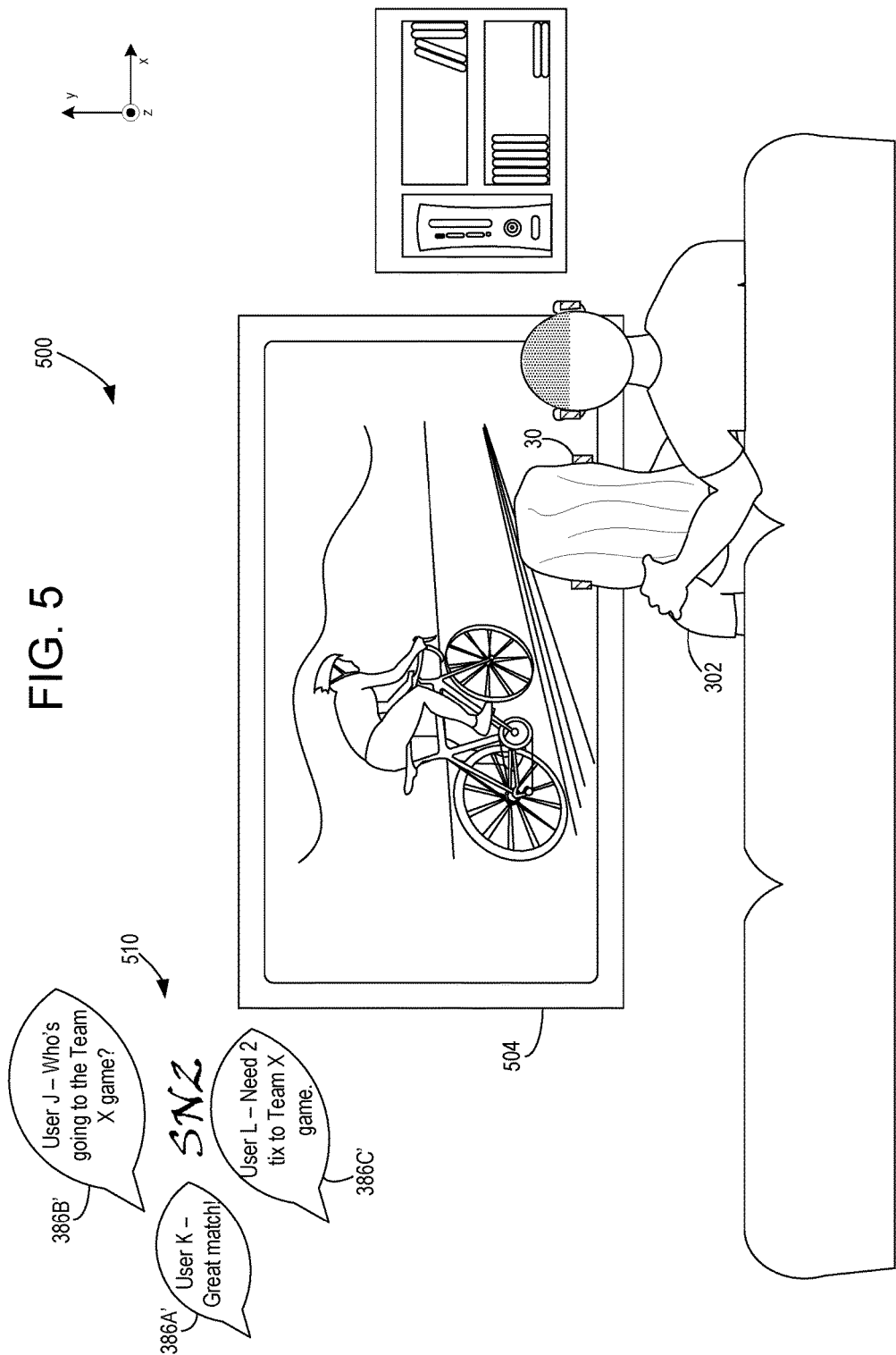
FIG. 5 shows a user from FIG. 3 wearing the head-mounted display device of FIG. 1 in a third room according to an example of the present description.

In some examples, the first user 302 may desire to view in two or more different locations the holograms of comments to a posting. With reference now to FIGS. 2, 3 and 5, the first user 302 may have an account at another social network SN2. A base virtual place-located anchor 230 may be world-locked to a virtual location 382 on or adjacent to the wall 384 in the living room 306. In this example, an anchor hologram in the form of a logo SN2 corresponding to the other social network may be displayed at the virtual location 382 corresponding to the base virtual place-located anchor 230.

The computing device 200 may transmit display data to the first display device 30 that causes the device to display holograms to the first user 302 at the base virtual place-located anchor 230 at the world-locked virtual location 382 adjacent to the wall 384. In this example, the holograms represent comments made to a posting of the first user 302 to the social network SN2 regarding the first user's favorite soccer team. For example, hologram 386A of the comment "Great match!" from User K may be displayed at the base virtual place-located anchor at the world-locked virtual location 382. One or more other holograms of comments to the first user's posting from other friends and/or users of the other social network SN2, such as holograms 386B and 386C, may also be displayed.

With reference now to FIG. 5, the first user 302 may provide user input to the first display device 30 to generate a mirrored virtual place-located anchor 240 at another world-locked virtual location in a media room 500. In this example, the world-locked virtual location is defined as the volume of space adjacent to the upper left corner of television 504 indicated at 510. Another anchor hologram in the form of logo SN2 may be displayed to the first user 302 at the world-locked virtual location 510 corresponding to the mirrored virtual place-located anchor 240.

When the first user 302 is present in the media room 500, the computing device 200 may transmit mirror display data to the first display device 30 that causes the first display device to display holograms 386A', 386B' and 386C' at the mirrored virtual place-located anchor at the world-locked virtual location 510. As illustrated in FIGS. 3 and 5, holograms 386A', 386B' and 386C' displayed to the first user 302 in media room 500 are copies of the holograms 386A, 386B and 386C displayed to the first user 302 in the living room 306. In this manner, the first user 302 may use the base virtual place-located anchor 230 and mirrored virtual place-located anchor 240 to conveniently view the same holograms in two different locations. In other examples, two, three or more mirrored virtual place-located anchors may be generated and located in corresponding different locations.

Figure 6:
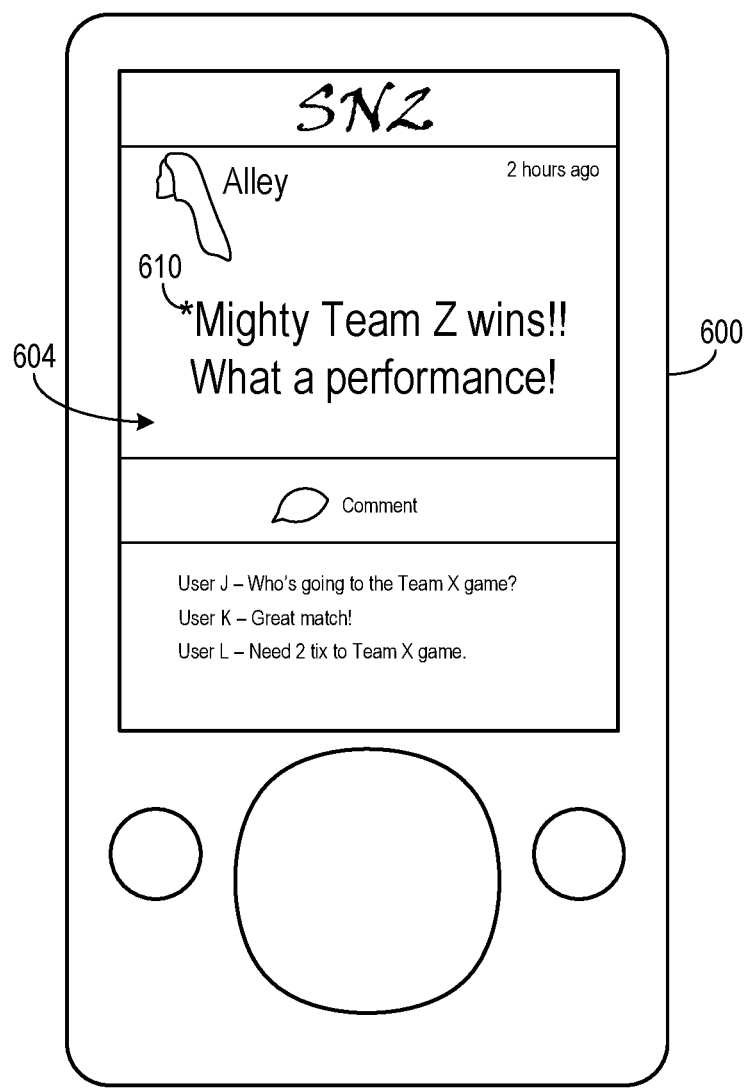
FIG. 6 shows a smartphone displaying a user interface for the social network according to an example of the present disclosure.

In some examples, the first user 302 may interact with a social network on one or more other display devices, such as a smartphone, tablet computer, etc. In some examples the social network may indicate that a posting from the first user 302 is associated with a virtual place located anchor. With reference now to FIG. 6, in one example the first user 302 (Alley) may interact with social network SN2 via a smartphone 600 that displays a mobile user interface 604 for the social network SN2. Alley may submit to the social network SN2 a posting in the form of a status update reading "Mighty Team Z wins!! What a performance!" In other examples, the posting may comprise an image such as a photograph, a video, and/or a text comment.

As described above, the first user 302 may cause first display device 30 via computing device 200 to display holograms of comments to her posting to social network SN2 at a virtual place-located anchor at a world-locked virtual location. In some examples, the computing device 200 also may instruct the social network SN2 to indicate that the first user's posting is associated with a virtual place-located anchor. In response and in the example of FIG. 6, the mobile user interface 604 of the social network SN2 may display an asterisk 610 with the first user's posting to signal to the first user 302 that this posting is associated with a virtual place-located anchor. In this manner, the first user 302 is conveniently alerted that holograms of comments to her posting are available at a corresponding virtual place-located anchor at a world-locked virtual location.

In other examples, a variety of other indicators and methods for indicating that a posting is associated with the virtual place-located anchor may be used. Such other examples may include, but are not limited to, highlighting, flashing, coloring, or otherwise altering the appearance of the posting. Also and as described in more detail below, in some examples the display of the smartphone 600 may visually augment a user's view of a real world environment by displaying virtual content such as two-dimensional images at a virtual place-located anchor.

In some examples, a user may interact with a virtual place-located anchor to reply to a comment displayed as a hologram. With reference again to FIG. 5, in one example the first user 302 may direct user input to the anchor hologram SN2 to reply to one of the displayed holographic comments. In some examples such user input may take the form of voice input, eye-tracking/gaze input, gesture input, or any other suitable form of user input. For example, the first user 302 may speak an instruction to the first display device 30 to "Reply to User J, quote I'm going to the Team X game. Want to carpool? end quote." In some examples, a hologram of the reply of first user 302 may be displayed to the first user 302 via first display device 30.

Figure 7A:
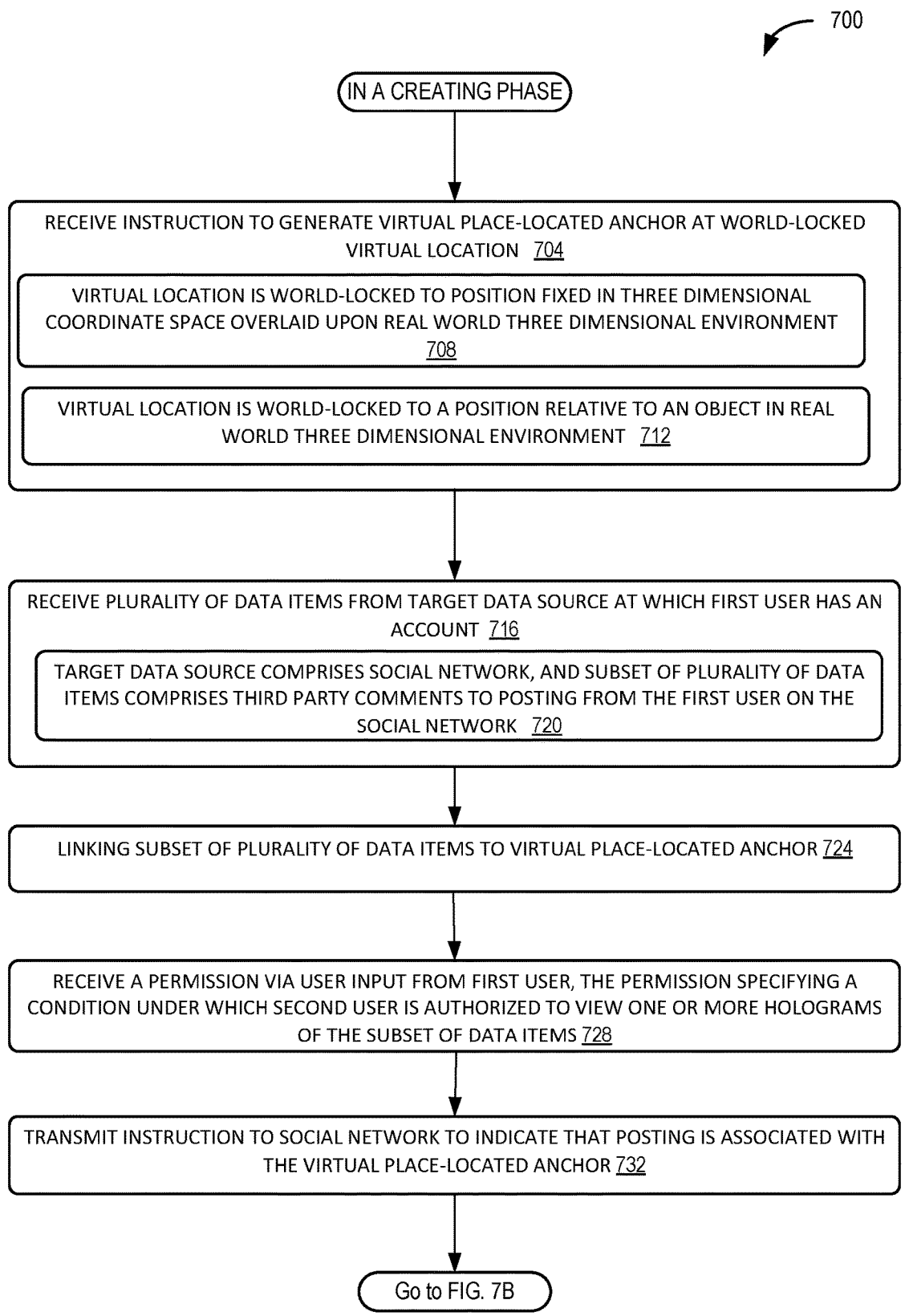
FIGS. 7A, 7B and 7C are a flow chart of a method of generating a virtual place-located anchor according to an example of the present description.
Figure 7B:
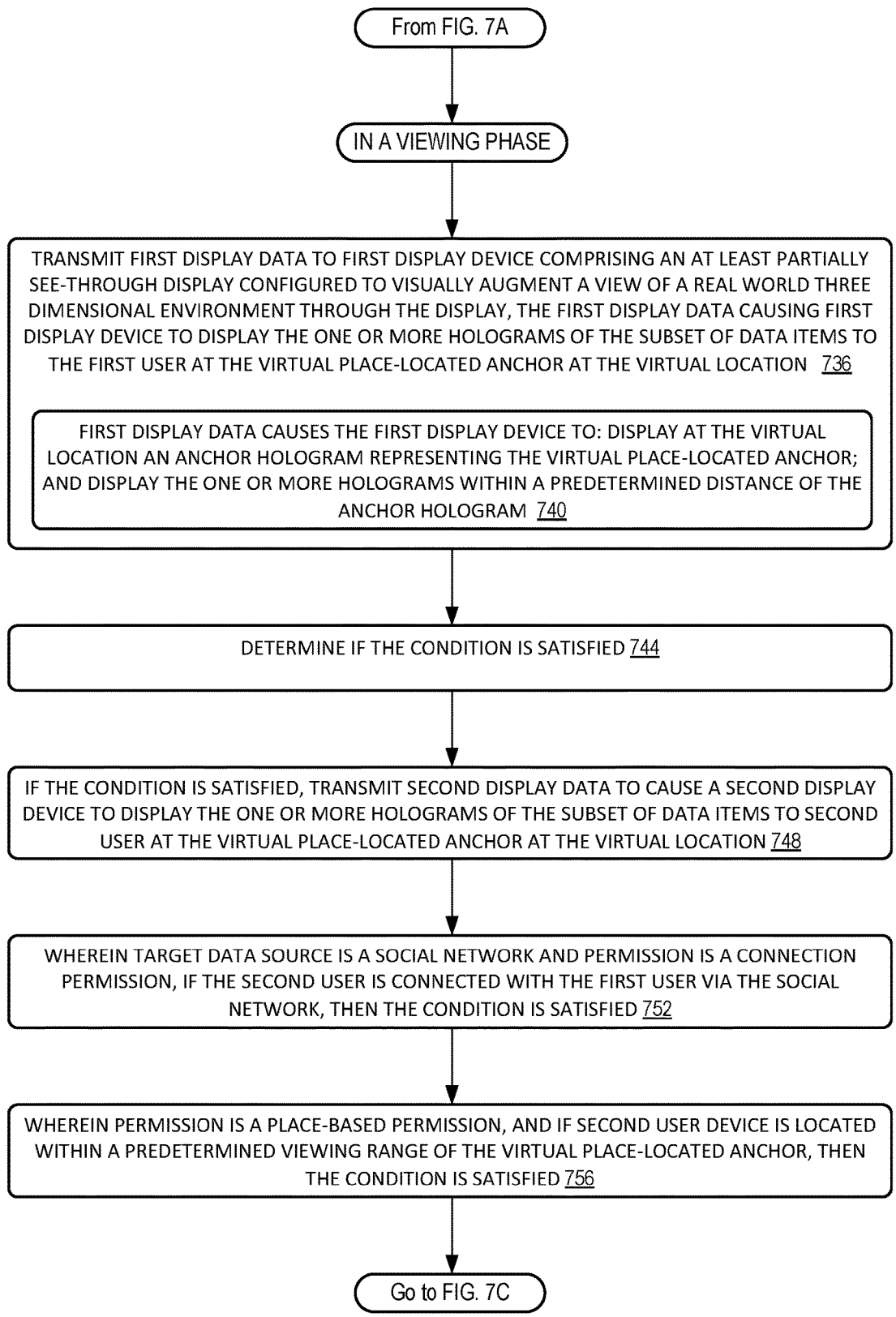
Figure 7C:
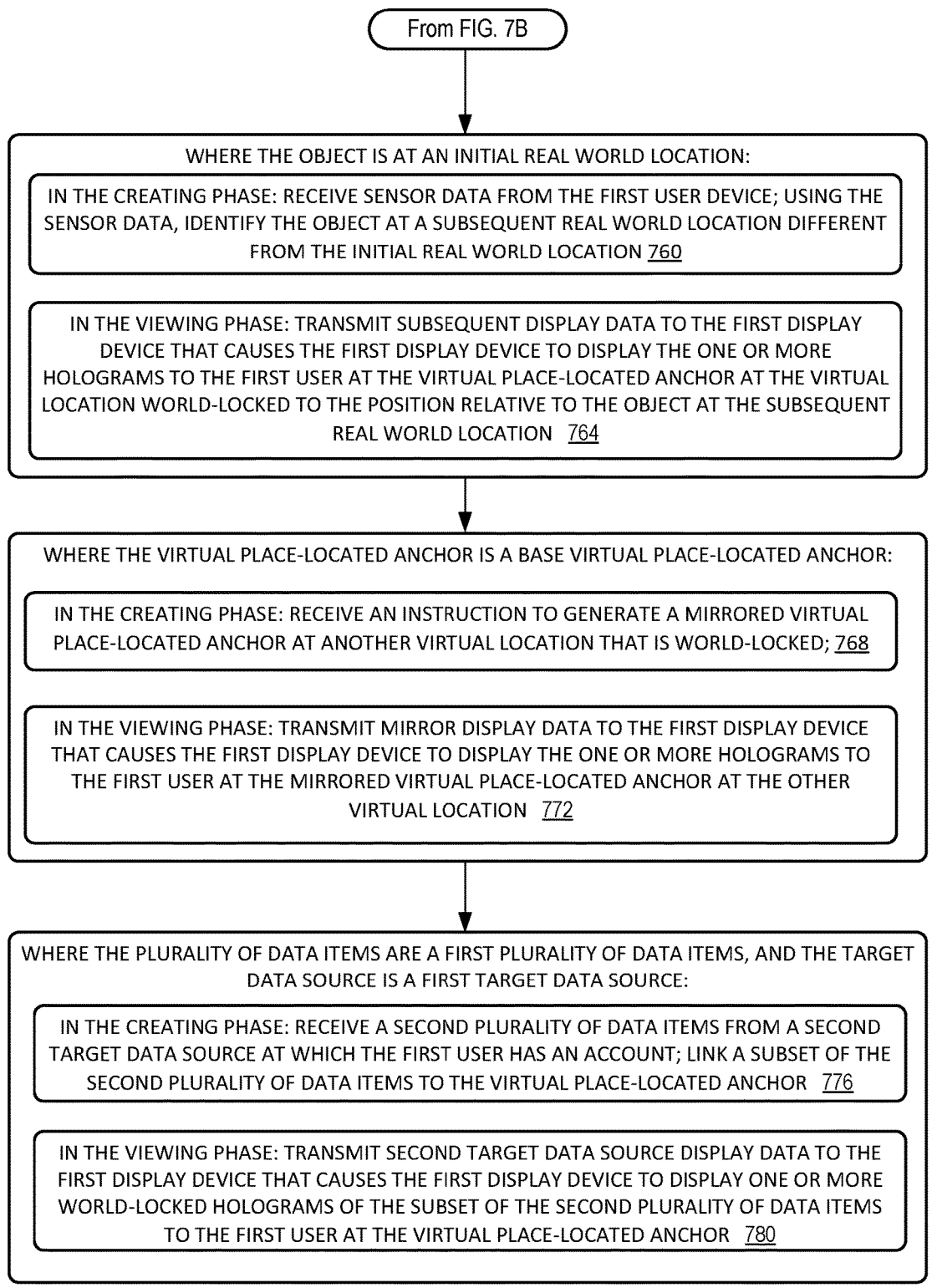

FIGS. 7A, 7B and 7C illustrate a flow chart of a method 700 for generating a virtual place-located anchor at which holograms may be viewed according to an example of the present disclosure. The following description of method 700 is provided with reference to the software and hardware components described above and shown in FIGS. 1-6. It will be appreciated that method 700 also may be performed in other contexts using other suitable hardware and software components.

With reference to FIG. 7A, at 704 the method 700 may include in a creating phase, receiving an instruction to generate a virtual place-located anchor at a virtual location that is world-locked. At 708 the virtual location may be world-locked to a position that is fixed in a three dimensional coordinate space overlaid upon the real world three dimensional environment. At 712 the virtual location may be world-locked to a position relative to an object in the real world three dimensional environment.

At 716 in the creating phase the method 700 may include receiving a plurality of data items from a target data source at which a first user has an account. At 720 the target data source may comprise a social network, and the subset of the plurality of data items may comprise third party comments to a posting from the first user on the social network. At 724 in the creating phase the method 700 may include linking a subset of the plurality of data items to the virtual place-located anchor.

At 728 in the creating phase the method 700 may include receiving a permission via user input from the first user, the permission specifying a condition under which a second user is authorized to view one or more holograms of the subset of data items. At 732 in the creating phase the method 700 may include transmitting an instruction to the social network to indicate that the posting is associated with the virtual place-located anchor.

With reference now to FIG. 7B, in a viewing phase at 736 the method 700 may include transmitting first display data to a first display device comprising an at least partially see-through display configured to visually augment a view of a real world three dimensional environment through the display, the first display data causing the first display device to display the one or more holograms of the subset of data items to the first user at the virtual place-located anchor at the virtual location. At 740 the first display data may cause the first display device to display at the virtual location an anchor hologram representing the virtual place-located anchor; and to display the one or more holograms within a predetermined distance of the anchor hologram.

At 744 in the viewing phase the method 700 may include determining if the condition is satisfied. At 748 in the viewing phase the method 700 may include, if the condition is satisfied, transmitting second display data to cause a second display device to display the one or more holograms of the subset of data items to the second user at the virtual place-located anchor at the virtual location. At 752 in the viewing phase the method 700 may include, where the target data source is a social network and the permission is a connection permission, if the second user is connected with the first user via the social network, then the condition is satisfied. At 756 in the viewing phase the method 700 may include, where the permission is a place-based permission, if the second display device is located within a predetermined viewing range of the virtual place-located anchor, then the condition is satisfied.

With reference now to FIG. 7C, where the virtual location is world-locked to a position relative to an object in the real world three dimensional environment, and where the object is at an initial real world location, at 760 in the creating phase the method 700 may include receiving sensor data from the first display device, and using the sensor data, identifying the object at a subsequent real world location different from the initial real world location. At 764 in the viewing phase the method 700 may include transmitting subsequent display data to the first display device that causes the first display device to display the one or more holograms to the first user at the virtual place-located anchor at the virtual location world-locked to the position relative to the object at the subsequent real world location.

Where the virtual place-located anchor is a base virtual place-located anchor, at 768 in the creating phase the method 700 may include receiving an instruction to generate a mirrored virtual place-located anchor at another virtual location that is world-locked. At 772 in the viewing phase the method 700 may include transmitting mirror display data to the first display device that causes the first display device to display the one or more holograms to the first user at the mirrored virtual place-located anchor at the other virtual location.

Where the plurality of data items are a first plurality of data items and the target data source is a first target data source, at 776 in the creating phase the method 700 may include receiving a second plurality of data items from a second target data source at which the first user has an account; and linking a subset of the second plurality of data items to the virtual place-located anchor. At 780 in the viewing phase the method 700 may include transmitting second target data source display data to the first display device that causes the first display device to display one or more world-locked holograms of the subset of the second plurality of data items to the first user at the virtual place-located anchor.

It will be appreciated that method 700 is provided by way of example and is not meant to be limiting. Therefore, it is to be understood that method 700 may include additional and/or alternative steps relative to those illustrated in FIGS. 7A, 7B and 7C. Further, it is to be understood that method 700 may be performed in any suitable order. Further still, it is to be understood that one or more steps may be omitted from method 700 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

While the above examples are described in the context of displaying holograms, it will be appreciated that the present disclosure may be utilized with other virtual content, such as two-dimensional images, and with non-holographic displays. For example, tablet computers, smartphones, and other mobile computing devices may receive a digital video feed that visually augments a user's view of a real world environment via a display according to the principles of the present disclosure.

Figure 8:
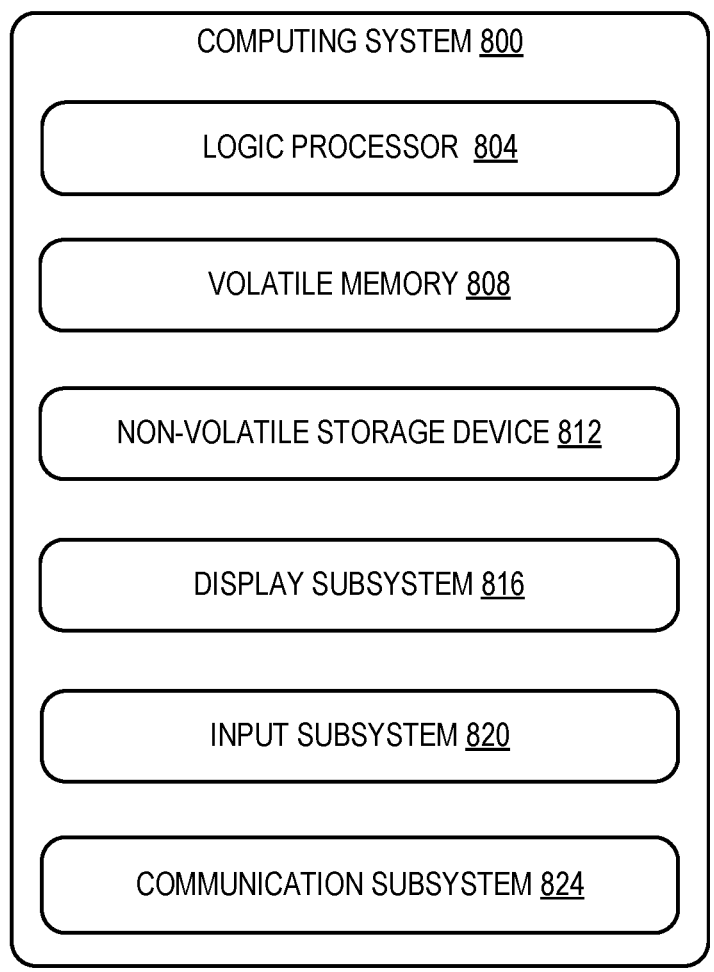
FIG. 8 shows a computing system according to an embodiment of the present description.

FIG. 8 schematically shows a non-limiting embodiment of a computing system 800 that can enact one or more of the methods and processes described above. Computing system 800 is shown in simplified form. Computing system 800 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 800 includes a logic processor 804, volatile memory 808, and a non-volatile storage device 812. Computing system 800 may optionally include a display subsystem 816, input subsystem 820, communication subsystem 824, and/or other components not shown in FIG. 8.

Logic processor 804 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 804 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 808 may include physical devices that include random access memory. Volatile memory 808 is typically utilized by logic processor 804 to temporarily store information during processing of software instructions. It will be appreciated that volatile memory 808 typically does not continue to store instructions when power is cut to the volatile memory 808.

Non-volatile storage device 812 includes one or more physical devices configured to hold instructions executable by the logic processors to implement the methods and processes described herein. When such methods and processes are implemented, the state of non-volatile storage device 812 may be transformed—e.g., to hold different data.

Non-volatile storage device 812 may include physical devices that are removable and/or built-in. Non-volatile storage device 812 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 812 may include nonvolatile, dynamic, static, read/write, read-only, sequential-access, location-addressable, file-addressable, and/or content-addressable devices. It will be appreciated that non-volatile storage device 812 is configured to hold instructions even when power is cut to the non-volatile storage device 812.

Aspects of logic processor 804, volatile memory 808, and non-volatile storage device 812 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 implemented to perform a particular function. In some cases, a program may be instantiated via logic processor 804 executing instructions held by non-volatile storage device 812, using portions of volatile memory 808. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 816 may be used to present a visual representation of data held by non-volatile storage device 812. As the herein described methods and processes change the data held by the non-volatile storage device, and thus transform the state of the non-volatile storage device, the state of display subsystem 816 may likewise be transformed to visually represent changes in the underlying data. Display subsystem 816 may include one or more display devices utilizing virtually any type of technology. Such display devices may be combined with logic processor 804, volatile memory 808, and/or non-volatile storage device 812 in a shared enclosure, or such display devices may be peripheral display devices. The image production system 22 configured to display virtual objects such as holograms via the at least partially see-through display 12 of HMD device 10 described above is one example of a display subsystem 816.

When included, input subsystem 820 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; any of the sensors described above with respect to position sensor system 18 of FIG. 1; and/or any other suitable sensor.

When included, communication subsystem 824 may be configured to communicatively couple computing system 800 with one or more other computing devices. Communication subsystem 824 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following paragraphs provide additional support for the claims of the subject application. One aspect provides a method, comprising: in a creating phase: receiving an instruction to generate a virtual place-located anchor at a virtual location that is world-locked; receiving a plurality of data items from a target data source at which a first user has an account; linking a subset of the plurality of data items to the virtual place-located anchor; receiving a permission via user input from the first user, the permission specifying a condition under which a second user is authorized to view one or more holograms of the subset of data items; in a viewing phase: transmitting first display data to a first display device comprising an at least partially see-through display configured to visually augment a view of a real world three dimensional environment through the display, the first display data causing the first display device to display the one or more holograms of the subset of data items to the first user at the virtual place-located anchor at the virtual location; determining if the condition is satisfied; and if the condition is satisfied, transmitting second display data to cause a second display device to display the one or more holograms of the subset of data items to the second user at the virtual place-located anchor at the virtual location. The method may additionally or optionally include wherein the target data source comprises a social network, and the subset of the plurality of data items comprises third party comments to a posting from the first user on the social network. The method may additionally or optionally include, in the creating phase, transmitting an instruction to the social network to indicate that the posting is associated with the virtual place-located anchor. The method may additionally or optionally include, wherein the first display data causes the first display device to: display at the virtual location an anchor hologram representing the virtual place-located anchor; and display the one or more holograms within a predetermined distance of the anchor hologram. The method may additionally or optionally include, wherein the virtual location is world-locked to a position that is fixed in a three dimensional coordinate space overlaid upon the real world three dimensional environment. The method may additionally or optionally include, wherein the virtual location is world-locked to a position relative to an object in the real world three dimensional environment. The method may additionally or optionally include, wherein the object is at an initial real world location: in the creating phase: receiving sensor data from the first display device; using the sensor data, identifying the object at a subsequent real world location different from the initial real world location; and in the viewing phase: transmitting subsequent display data to the first display device that causes the first display device to display the one or more holograms to the first user at the virtual place-located anchor at the virtual location world-locked to the position relative to the object at the subsequent real world location. The method may additionally or optionally include, wherein the virtual place-located anchor is a base virtual place-located anchor: in the creating phase: receiving an instruction to generate a mirrored virtual place-located anchor at another virtual location that is world-locked; and in the viewing phase: transmitting mirror display data to the first display device that causes the first display device to display the one or more holograms to the first user at the mirrored virtual place-located anchor at the other virtual location. The method may additionally or optionally include, wherein the plurality of data items are a first plurality of data items, the target data source is a first target data source, the method further comprising: in the creating phase: receiving a second plurality of data items from a second target data source at which the first user has an account; linking a subset of the second plurality of data items to the virtual place-located anchor; and in the viewing phase: transmitting second target data source display data to the first display device that causes the first display device to display one or more world-locked holograms of the subset of the second plurality of data items to the first user at the virtual place-located anchor. The method may additionally or optionally include, wherein the target data source is a social network and the permission is a connection permission, and if the second user is connected with the first user via the social network, then the condition is satisfied. The method may additionally or optionally include, wherein the permission is a place-based permission, and if the second display device is located within a predetermined viewing range of the virtual place-located anchor, then the condition is satisfied.

Another aspect provides a computing device, comprising: an anchor program executed by a processor of the computing device, the anchor program configured to: in a creating phase: receive an instruction to generate a virtual place-located anchor at a virtual location that is world-locked; receive a plurality of data items from a target data source at which a first user has an account; link a subset of the plurality of data items to the virtual place-located anchor; receive a permission via user input from the first user, the permission specifying a condition under which a second user is authorized to view one or more holograms of the subset of data items; in a viewing phase: transmit first display data to a first display device comprising an at least partially see-through display configured to visually augment a view of a real world three dimensional environment through the display, the first display data causing the first display device to display the one or more holograms of the subset of data items to the first user at the virtual place-located anchor at the virtual location; determine if the condition is satisfied; and if the condition is satisfied, transmit second display data to cause a second display device to display the one or more holograms of the subset of data items to the second user at the virtual place-located anchor at the virtual location. The computing device may additionally or optionally include, wherein the virtual location is world-locked to a position that is fixed in a three dimensional coordinate space overlaid upon the real world three dimensional environment. The computing device may additionally or optionally include, wherein the virtual location is world-locked to a position relative to an object in the real world three dimensional environment. The computing device may additionally or optionally include, wherein the object is at an initial real world location, and the anchor program is configured to: in the creating phase: receive sensor data from the first display device; using the sensor data, identify the object at a subsequent real world location different from the initial real world location; and in the viewing phase: transmit subsequent display data to the first display device that causes the first display device to display the one or more holograms to the first user at the virtual place-located anchor at the virtual location world-locked to the position relative to the object at the subsequent real world location. The computing device may additionally or optionally include, wherein the subset of the plurality of data items comprises third party comments related to an image, a video, a comment, or an update that is posted by the first user to the target data source. The computing device may additionally or optionally include, wherein the anchor program is configured to: in the creating phase: receive from the first display device an image of an object in the real world three dimensional environment at the virtual location, wherein the image is posted to the target data source; and filter the plurality of data items by selecting third party comments associated with the image as the subset of the plurality of data items. The computing device may additionally or optionally include, wherein the virtual place-located anchor is a base virtual place-located anchor, and the anchor program is configured to: in the creating phase: receive an instruction to generate a mirrored virtual place-located anchor at another virtual location that is world-locked; and in the viewing phase: transmit mirror display data to the first display device that causes the first display device to display the one or more holograms to the first user at the mirrored virtual place-located anchor at the other virtual location. The computing device may additionally or optionally include, wherein the plurality of data items are a first plurality of data items, the target data source is a first target data source, and the anchor program is configured to: in the creating phase: receive a second plurality of data items from a second target data source at which the first user has an account; link a subset of the second plurality of data items to the virtual place-located anchor; and in the viewing phase: transmit second target data source display data to the first display device that causes the first display device to display one or more world-locked holograms of the subset of the second plurality of data items to the first user at the virtual place-located anchor.

Another aspect provides a method, comprising: in a creating phase: receiving an instruction to generate a virtual place-located anchor at a virtual location that is world-locked to a position relative to an object in the real world three dimensional environment; receiving a plurality of data items from a social network at which a first user has an account; linking a subset of the plurality of data items to the virtual place-located anchor, the subset of data items comprising third party comments to a posting from the first user on the social network; receiving a permission via user input from the first user, the permission specifying a condition under which a second user is authorized to view one or more holograms of the subset of data items; in a viewing phase: transmitting first display data to a first display device comprising an at least partially see-through display configured to visually augment a view of a real world three dimensional environment through the display, the first display data causing the first display device to display the one or more holograms of the subset of data items to the first user at the virtual place-located anchor at the virtual location; determining if the condition is satisfied; and if the condition is satisfied, transmitting second display data to cause a second display device to display the one or more holograms of the subset of data items to the second user at the virtual place-located anchor at the virtual location.

The invention claimed is:

1. A method, comprising:
receiving an instruction to generate a virtual place-located anchor at a virtual location that is world-locked;
receiving third party comments to a posting from a first user on a social network, wherein the posting is associated with the virtual place-located anchor;
linking the third party comments to the virtual place-located anchor;
causing a first display device to display the third party comments at the virtual place-located anchor to a first user;
determining if a condition under which a second user is authorized to view the third party comments is satisfied; and
if the condition is satisfied, causing a second display device to display the third party comments to the second user at the virtual place-located anchor.

2. The method of claim 1, further comprising transmitting an instruction to the social network to indicate that the posting is associated with the virtual place-located anchor.

3. The method of claim 1, further comprising:
displaying at the virtual location an anchor hologram representing the virtual place-located anchor; and
displaying the third party comments within a predetermined distance of the anchor hologram.

4. The method of claim 1, wherein the virtual location is world-locked to a position that is fixed in a three dimensional coordinate space overlaid upon the real world three dimensional environment.

5. The method of claim 1, wherein the virtual location is world-locked to a position relative to an object in the real world three dimensional environment.

6. The method of claim 5, wherein the object is at an initial real world location, further comprising:
receiving sensor data from the first display device;
using the sensor data, identifying the object at a subsequent real world location different from the initial real world location; and
causing the first display device to display the third party comments to the first user at the virtual place-located anchor at the virtual location world-locked to the position relative to the object at the subsequent real world location.

7. The method of claim 1, wherein the virtual place-located anchor is a base virtual place-located anchor, the method further comprising:
receiving an instruction to generate a mirrored virtual place-located anchor at another virtual location that is world-locked; and
causing the first display device to display the third party comments to the first user at the mirrored virtual place-located anchor at the other virtual location.

8. The method of claim 1, wherein the third party comments are a first plurality of third party comments, the social network is a first social network, the method further comprising:
receiving a second plurality of third party comments from a second social network;
linking a subset of the second plurality of third party comments to the virtual place-located anchor; and
causing the first display device to display world-locked virtual content of the subset of the second plurality of third party comments to the first user at the virtual place-located anchor.

9. The method of claim 1, wherein if the second user is connected with the first user via the social network, then the condition is satisfied.

10. The method of claim 1, wherein if the second display device is located within a predetermined viewing range of the virtual place-located anchor, then the condition is satisfied.

11. A computing device, comprising:
an anchor program executed by a processor of the computing device, the anchor program configured to:
receive an instruction to generate a virtual place-located anchor at a virtual location that is world-locked;
receive third party comments to a posting from a first user on a social network, wherein the posting is associated with the virtual place-located anchor;
link the third party comments to the virtual place-located anchor;
cause a first display device to display virtual content of the third party comments at the virtual place-located anchor to a first user;
determine if a condition under which a second user is authorized to view the third party comments is satisfied; and
if the condition is satisfied, cause a second display device to display the third party comments to the second user at the virtual place-located anchor.

12. The computing device of claim 11, wherein the virtual location is world-locked to a position that is fixed in a three dimensional coordinate space overlaid upon the real world three dimensional environment.

13. The computing device of claim 11, wherein the virtual location is world-locked to a position relative to an object in the real world three dimensional environment.

14. The computing device of claim 13, wherein the object is at an initial real world location, and the anchor program is configured to:
receive sensor data from the first display device;
using the sensor data, identify the object at a subsequent real world location different from the initial real world location; and
cause the first display device to display the third party comments to the first user at the virtual place-located anchor at the virtual location world-locked to the position relative to the object at the subsequent real world location.

15. The computing device of claim 11, wherein the third party comments are related to an image, a video, a comment, or an update that is posted by the first user to the social network.

16. The computing device of claim 11, wherein the anchor program is configured to:
receive from the first display device an image of an object in the real world three dimensional environment at the virtual location, wherein the posting from the first user on the social network comprises the image.

17. The computing device of claim 11, wherein the virtual place-located anchor is a base virtual place-located anchor, and the anchor program is configured to:
receive an instruction to generate a mirrored virtual place-located anchor at another virtual location that is world-locked; and
cause the first display device to display the third party comments to the first user at the mirrored virtual place-located anchor at the other virtual location.

18. The computing device of claim 11, wherein the third party comments are a first plurality of third party comments, the social network is a first social network, and the anchor program is configured to:
receive a second plurality of third party comments from a second social network;
link a subset of the second plurality of third party comments to the virtual place-located anchor; and
cause the first display device to display world-locked virtual content of the subset of the second plurality of third party comments to the first user at the virtual place-located anchor.

19. A head-mounted display device, comprising:
a computing device;
a non-see-through display; and
an anchor program executed by a processor of the computing device, the anchor program configured to:
receive an instruction to generate a virtual place-located anchor at a virtual location that is world-locked;
receive third party comments to a posting from a first user on a social network, wherein the posting is associated with the virtual place-located anchor;
link the third party comments to the virtual place-located anchor;
cause the non-see-through display to display the third party comments-at the virtual place-located anchor to a first user;

determine if a condition under which a second user is authorized to view the third party comments is satisfied; and if the condition is satisfied, cause another display device to display the third party comments to the second user at the virtual place-located anchor.

\* \* \* \* \*